Nov. 26, 1963
C. P. KRUPP
3,112,234
METHOD OF MAKING FILAMENT-WOUND PRESSURE VESSELS
Filed Oct. 5, 1960
4 Sheets-Sheet 1
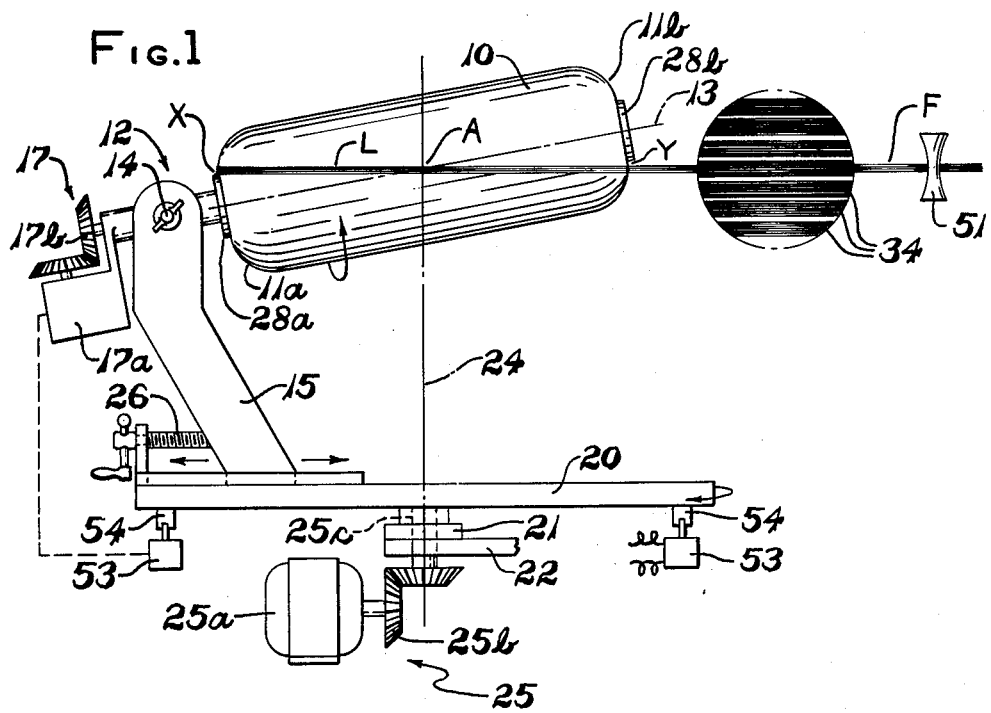
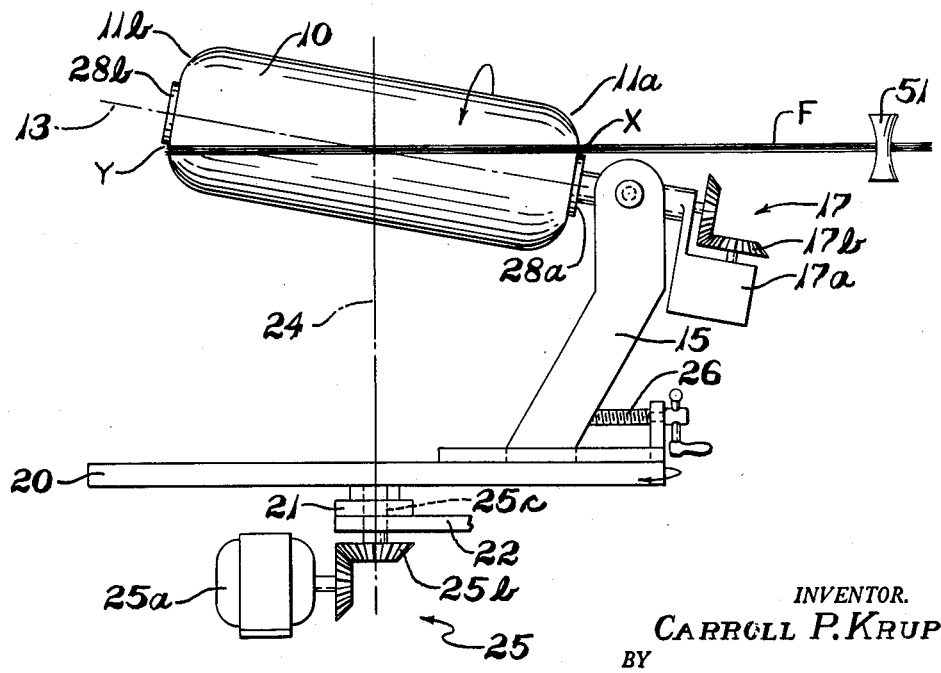
INVENTOR.
CARROLL P. KRUPP
BY
John D. Haney
ATTY.

Nov. 26, 1963     C. P. KRUPP     3,112,234
METHOD OF MAKING FILAMENT-WOUND PRESSURE VESSELS
Filed Oct. 5, 1960     4 Sheets-Sheet 2

INVENTOR.
CARROLL P. KRUPP
BY
John O. Harvey
ATTY.

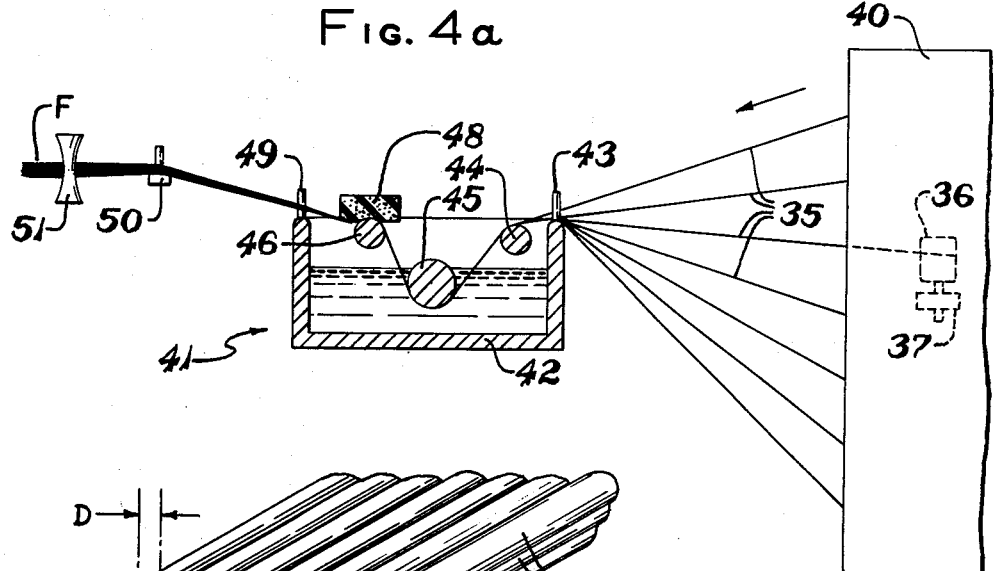
Fig. 4a
Fig. 7
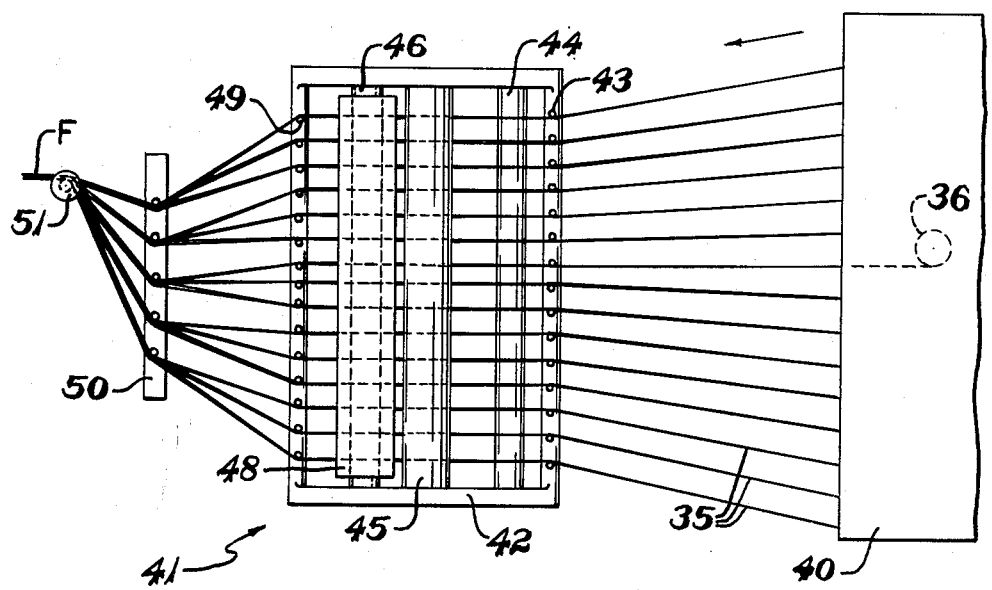
Fig. 4b

Nov. 26, 1963 C. P. KRUPP 3,112,234
METHOD OF MAKING FILAMENT-WOUND PRESSURE VESSELS
Filed Oct. 5, 1960 4 Sheets-Sheet 4

INVENTOR.
CARROLL P. KRUPP
BY
ATTY.

3,112,234
METHOD OF MAKING FILAMENT-WOUND
PRESSURE VESSELS
Carroll P. Krupp, Akron, Ohio, assignor to The B. F.
Goodrich Company, New York, N.Y., a corporation
of New York
Filed Oct. 5, 1960, Ser. No. 60,617
3 Claims. (Cl. 156—169)

This invention relates to the manufacture of hollow articles with reinforcements of wound filamentary material. The invention has special utility in making hollow vessels, tanks, containers and the like adapted to sustain internal pressure. More particularly, the invention is directed to methods for making such articles, and to the articles resulting from such methods.

According to this invention, continuous filamentary material is wound to form a reinforcement in an article such as a pressure vessel so that the reinforcement offers substantially the maximum resistance to internal bursting forces commensurate with the ultimate tensile strength of the winding material. That is to say, the invention provides for winding filamentary material into a reinforcement to derive the maximum beneficial use of the inherent tensile strength of the filamentary material in the resulting reinforcement. Articles may be made, therefore, having a larger strength-to-weight ratio than has been possible to achieve prior to this invention, a result of much importance for articles used for aircraft or other airborne service, and which is also important for economical use of materials.

A reinforcement as provided by this invention includes a continuous winding of filamentary material extending generally lengthwise of the article and another continuous winding extending circumferentially of the article. The lengthwise winding envelopes the article in a succession of geodetic loops from a location at or near one end or pole portion of the article to a corresponding location at the opposite end of a longitudinal axis through the article. The circumferential winding is superimposed on the longitudinal winding in a succession of loops transverse to the lengthwise winding and encircling the girth or circumference of the article. The lengthwise windings are preferably laid as nearly parallel to the longitudinal axis of the article as is practicable in the article, whereas the girth windings are laid in a closed spiral substantially normal to the longitudinal axis of the article. Accordingly, the filamentary material in the lengthwise winding resists pressure forces inside the article tending to blow the ends off the article, whereas the girth windings resist circumferential expansion of the article.

The portions of the filamentary material in the successive circuits or loops in the lengthwise and in the circumferential windings are laid side-by-side, or one upon another, without intermeshing or interlacing. Consequently, the material is not sharply crimped over itself anywhere in the reinforcement, thereby avoiding localized weakening of the filamentary material, or the tendency for the materials to chafe or "saw" against each other when the article undergoes internal pressure changes. In the lengthwise windings, the material of any one loop is deflected to bridge an adjoining loop only at or near the poles or ends of the article.

To form the lengthwise winding, the general procedure is to train the filamentary material from stationary creels or other supply mechanism to a winding form. While the train of the filamentary material in the region adjacent the form is maintained in a fixed winding plane relative to the form, the form is revolved in the winding plane and periodically indexed about its longitudinal axis so that the material is wrapped in successive convolutions lengthwise of the form. After sufficient lengthwise windings are applied to provide the desired longitudinal strength, the winding form is then rotated on its longitudinal axis only, to wind about it the girth or circumferential winding by a simple "lathe-wrapping" technique.

The filamentary material is preferably trained to the winding form as a weftless tape composed of a series of laterally abutting strands under individual controlled tension. The individual strands of such tapes preferably are arranged side by side to define a generally flat tape. The strands may be cords or rovings, solid filaments and the like of synthetic or natural fibers, organic or inorganic, or they may be wires. Preferably for making tanks and pressure vessels for aircraft service the filamentary material is glass fiber encapsulated in a resin matrix. When using glass fibers the component strands of the winding tape are preferably yarns of fibers gathered together without any appreciable twist. The fibers composing such yarns are preferably encapsulated with molding resin while the fibers are in their nascent state, namely encapsulated as they are drawn from a glass furnace. The yarns are passed through a resin applicator as they are drawn from their creel to the winding form to apply a carefully controlled additional amount of resin to each such yarn, and then the yarns are gathered without twisting into the several individual strands of the tapes.

Ordinarily, wider tapes of the foregoing character are preferred to narrower tapes in practising the invention but the tape width will be governed to a large extent by the shape of the article and its end portions. Weftless tapes in the order of five or six inches wide and composed of many strands may be used advantageously for certain large articles. Wider tapes are desirable because they produce end sections of the reinforcement of more uniform thickness, and the wider tapes minimize the fanning effect or separation of the strands from each other often found with narrow tapes at the shoulder regions of the article when the article contour changes from say a generally cylindrical shape to a dome-like curved end surface. Regardless of the number of strands of such weftless tape, each strand thereof has individually controlled tension. Thus the tape can be deflected sharply around complex contoured corners without wrinkling the tape, each strand responding to the demand for the particular length of it along the portion of the winding form traversed by such strand.

The particular molding resin used in each instance is selected for its compatibility with the filamentary material used. Resins are selected which adhere adequately to the particular filamentary material, having elongation characteristics generally equivalent to the filamentary material, and which can be cured without damaging the filamentary material. Hard setting resins are used such as the epoxies.

An important advantage of the winding method of this invention is in the accuracy at which loops or convolutions of the winding may be laid, even in articles of very large size, so that these loops are not only oriented exactly in the direction desired, but also the loops are uniformly distributed in the article. Balanced winding patterns from layer to layer of each winding are obtained from the winding method. When the resulting article is loaded by internal pressure, therefore, the filament portions of all the winding loops are loaded substantially equally and in direction tension with a minimum of interlaminar shear. With the level of placement accuracy achieved through the method of this invention, a reinforcement can be formed having an ultimate mass stress in a plane normal to the filaments which is in the order of 80% or more of the ultimate stress the filamentary winding material itself is capable of sustaining.

Owing to the accuracy with which the windings may be laid, and also to the orientation of the windings, pressure containers embodying such reinforcements may be designed quite accurately as to size and strength requirements. Moreover, the invention provides an exceptionally rapid production technique for making these articles. The lengthwise windings may be generated to enclose the winding form very quickly even though the winding form is revolved at relatively low speeds.

The invention also provides for winding reinforcing pieces, called "patches," integrally into the reinforcement at any location therein so that regions of the reinforcement at such patches may be cut away for the attachment of fittings without substantially impairing the strength of the reinforcement. Special fittings located at the pole regions of the article may be wound integrally into the reinforcement.

The invention will be further described with reference to the accompanying drawings which illustrate, by way of example, one preferred form of apparatus for winding reinforcements in a typical article made according to the invention. The drawings showing the apparatus are essentially diagrammatic in character because they are intended primarily to illustrate the winding method.

In the drawings:

FIG. 1 is a side elevation of a preferred winding apparatus showing the main components of the apparatus and manner in which the apparatus is adjusted for applying lengthwise windings, a portion of the winding tape in this view being drawn on an enlarged scale;

FIG. 2 is a view of the apparatus of FIG. 1, but which has been rotated 180° from the FIG. 1 position to illustrate the winding motion of the apparatus;

FIG. 4a is a side elevation of the filament-supply apparatus through which the filamentary winding material is guided to the apparatus of FIGS. 1–3;

FIG. 4b is a plan view of the apparatus shown in FIG. 4a;

FIG. 7 is an enlarged detail view showing one way in which filaments in either the lengthwise or circumferential winding may be laid on each other;

Figure 3:
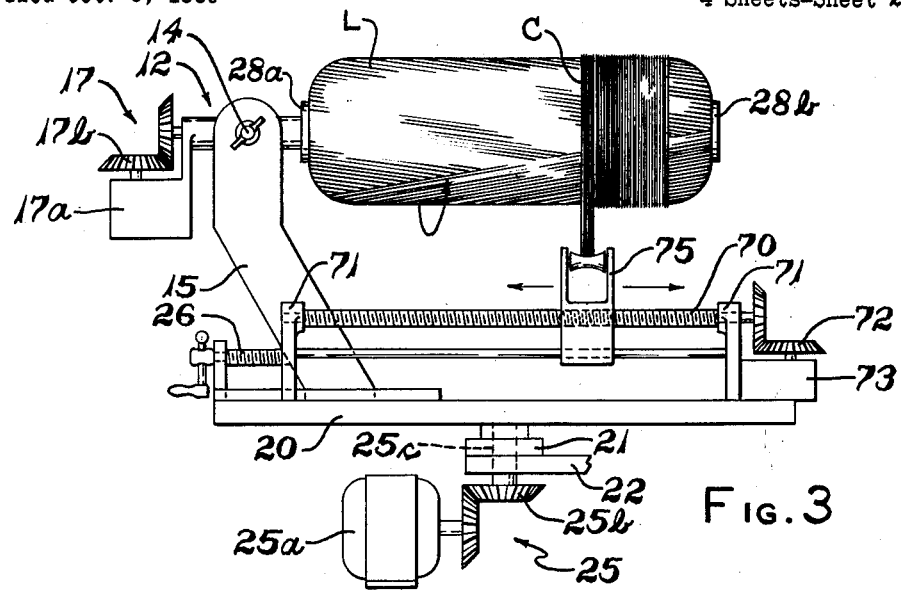
FIG. 3 is a view of the same apparatus but equipped with mechanism for applying a circumferential winding, the apparatus being shown in its position for circumferential windings.

The preferred apparatus for practising this invention, as shown in FIG. 1–3, embodies a winding form 10 upon which the reinforcement is made. The winding form 10 is supported at one end 11a by a spindle mechanism 12 for rotation on a longitudinal axis 13 through the form, the form 10 being removably fastened to the spindle 12 by any appropriate means (not shown) so that the form may be rotated by the spindle. The opposite end 11b of the winding form 10 is unsupported. The spindle 12 is adjustably mounted on a horizontal pivot 14 at the top of a spindle-support member 15 so that the position of the form axis 13 may be adjusted in a vertical plane to different angles to the horizontal. The spindle mechanism 12 includes a drive unit 17 having an appropriate motor 17a and gearing 17b to rotate the winding form about its longitudinal axis 13 at any selected angular position of the form.

Spindle support member 15 is carried on a horizontal table 20 which in turn is supported by a bearing 21 engaging a fixed support 22. The table 20 is rotatable relative to the support 22 including motor 25a, gearing 25b, and a shaft 25c which extends through the support 22 and is connected to the table. Accordingly, when table 20 is rotated by drive 25, all the mechanism carried by the table, including winding form 10 is revolved in a circular path around the table axis 24. The support member 15 is also mounted for adjustment on the table in a direction radially toward or away from axis 24 by an adjusting screw 26 in order to locate the form 10 accurately relative to axis 24.

The size and shape of the winding form 10, and also its structural details may vary widely depending on the nature of the article to be made on the form. The winding form 10 selected for illustration has a simple generally cylindrical shape symmetrical on its longitudinal axis 13 and with curved dome-like end surfaces 11a and 11b. It is made of plaster (see FIG. 10). The end surfaces include integral projections 28a and 28b, respectively, each with an annular periphery concentric with the form axis 13. Optionally, these projections can be omitted, or special end fittings separate from the form could be substituted for these projections, about which fittings the reinforcement can be wound so that the fittings become an integral part of the article.

The term "winding form" is used herein in a broad general sense to refer to any object about or upon which the windings are made. Ordinarily the windings are made upon a form similar to the form 10 shown, the outer surface of which is the same size and shape as the interior of the article made on the form. Since the winding form is usually to be removed from the article after the article is made, the form may be made of substances such as plaster or metal or plastic having a low melting temperature so that the form is easily destroyed to effect its removal. Forms made of hard material and equivalent in size and shape to the interior of the article are preferred, if the dimensions of the article to be made on the form are critical. Inflatable forms and mandrels may be used also in practising the invention but these are not preferred where dimensional accuracy of the product is important. For making articles of relatively large size and with adequately large end openings, it is advantageous to use light weight collapsible forms which are an assemblage of stave-like elements which can be disassembled inside the finished article and removed through the end openings of the article. Collapsible forms of this latter type are preferably coated externally with a hard setting resin after they are initially assembled and the coating is then trimmed or shaped to the exact dimensions desired.

Figure 10:
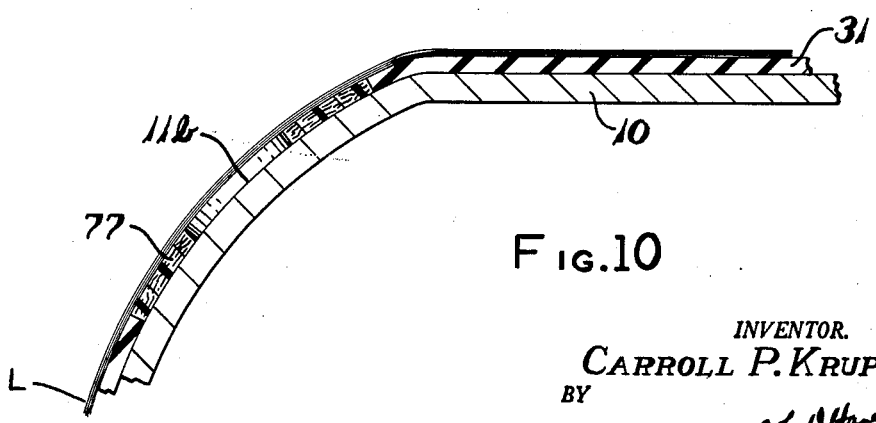
FIG. 10 is a sectional view on the line 10—10 of FIG. 9.

Tanks and containers embodying these wound reinforcements may also include carcass portions of other materials in addition to the reinforcing windings. The term "winding form" is also used herein to include the use of an unfinished carcass portion of the article as the winding form. For example, FIG. 10 shows a part of a pressure tank made according to this invention which includes an interior rubber lining 31. In making this article a plaster winding form 10 is first enclosed with the rubber layer 31. Then the filamentary material is wound directly on the outside surface of this rubber layer 31.

The term "winding form" also includes the expedient of mounting end pieces of forms, or fittings, in coaxial separated positions so that the filamentary material may be wound directly from one such end piece or fitting to the other without any supporting surface engaging the winding therebetween. Articles having cylindrical body portions may be made in this manner, it being unnecessary to provide lateral support for the windings intermediate their end fittings in such articles, although the accuracy with which the windings are laid is ordinarily improved by using a form which provides such support.

Filamentary material F in the form of a relatively wide weftless tape composed of a group of individually tensioned strands 34 (see magnified section in FIG. 1) of glass fiber is trained to the side of the winding form 10 from the mechanism shown in FIGS. 4a and 4b. Each strand 34 consists of a group of glass fiber yarns 35 (FIG. 4a) gathered into the strand without any appreciable twisting of the yarns. Each yarn 35 may be composed of one hundred or more glass fiber filaments individually encapsulated in a molding resin. Each yarn is wound on a bobbin such as bobbin 36 in FIG. 4a which has an appropriate individual tension control 37. The group of bobbins are supported in a stationary creel 40. The yarns 35 are drawn from their respective bobbins in the creel and the array is passed through a resin applicator 41. The resin applicator includes a relatively wide tank 42 containing a liquid molding resin. The yarns are laterally separated from each other by a fine comb 43 as they enter the tank 42, and are initially deflected over a bar 44 into the resin bath. The yarns are passed under a bar 45 immersed in the resin and then are deflected upwardly over bar 46 above the liquid of the resin in the tank where the yarns, separated one from another, are passed under a wiper 48 preferably of sponge rubber and which is in light pressure engagement with the yarns so that it wipes excess resin from the yarns including the side portions of the yarns. From the wiper 48 the array of yarns passes through another fine comb 49 of the same size as the entry comb 43. Then the yarns are passed through a coarse comb 50 beyond the resin applicator at which they are gathered into several strands 34. Next the strands are passed over a fixed guide roller 51 whose periphery is concave so that it brings the strands into a weftless tape of desired width.

The function of the resin on the strands is for bonding the strands one to another in the finished article, and for making pressure vessels, ordinarily only the minimum quantity of resin needed to bond the strands to each other is desired. The quantity of resin applied to the yarns and strands may be accurately controlled by carefully regulating the proportion of resin solids in the resin solution contained in the dip tank 42 and also by proper adjustment of the pressure exerted by wiper 48 on the yarns.

In making the windings, the yarns and strands are preferably maintained under low tension, the tension level preferably being adequate to prevent sagging of the tape between fixed guide roller 51 and the winding form and to assure a solid mass to the wound article.

In the operation of applying lengthwise windings L (see FIGS. 1–3 and 6) with this apparatus, the portion of tape F extending between the form 10 and fixed guide roller 51 is maintained in a fixed horizontal winding plane which is perpendicular to the vertical axis of revolution 24 of the table 20. The winding form 10 is supported by the spindle 12 in a position so that the axis 13 of the form is at an angle to the table 20 and so that the tape F approaches the front side of the form as it is viewed in FIG. 1. Accordingly, the form axis 13 intersects the winding plane at a location A intermediate the ends of the form. Additionally the winding form 10 is positioned so that the vertical table axis 24 also intersects axis 13 and the winding plane at location A.

The position of the winding form 10 in FIG. 1 and its shape is such that the winding plane intersects the end portions 11a and 11b of the form and is tangent to both points X and Y, respectively, on the annular periphery of projections 28a and 28b, respectively, on the end portions of the form. Point X on projection 28a is above the axis 13 in the FIG. 1 position of the apparatus, and point Y on projection 28b lies below axis 13, point Y being offset arcuately 180° from point X relative to axis 13. Since the peripheries of the projections 28a and 28b are of equal diameter, and the form is symmetric on its axis 13, it follows that in the case shown in FIGS. 1–3, the intersection of the axes 13, 24 and the winding plane, at location A, will coincide with the mass center of the winding form 10.

To start the lengthwise winding L, the tape F may be attached (by cement or a small piece of adhesive tape, not shown) to the supported end 11a of the winding form while the form is in its FIG. 1 position, the lowermost strand of tape F being tangent to point X on the periphery of projection 28a. As the table 20 in FIG. 1 is then rotated by drive mechanism 25 in a clockwise direction as viewed from above the table, the form is revolved about location A, its center, so that its unsupported end 11b moves forwardly toward the train of tape F. The tape is therefore wrapped in a geodetic loop along the surface of the form from point X and across the end surface 11b of the form as a result of the rotation of the table. By the time the table 20 has been rotated more than 90° from its FIG. 1 position, the uppermost strand in the tape, defining the upper edge of the tape, is wrapped tangentially to the annular periphery of projection 28b at point Y. The remaining strands of the tape lie side by side across the end surface 11b.

FIG. 2 shows the position of the apparatus after table 20 has been rotated 180° from its FIG. 1 position. By the time the table reaches the FIG. 2 position, the tape has been wrapped across end 11b, and then wrapped along the opposite side of the form along a geodesic of the form toward point X at supported end 11a. Continued rotation of table 20 in the same direction from its FIG. 2 position causes the spindle 12 and supported end 11a of the form to move forward toward the observer, passing under the train of tape F so that the tape is wrapped across end surface 11a of the form with the lowermost strand of the tape substantially tangent to point X.

The form 10 is not rotated on its axis 13 as it is revolved by table 20, except when the form is in two positions 180° apart from each other. At each of these positions the form is rotated slightly on its axis 13 to index the surface of the form relative to tape F. The indexing motion occurs each time the form is revolved to a position in which one of its end projections 28 comes into tangential engagement with the tape. During the first 90° of table rotation from the FIG. 1 position, the form is held by spindle 12 against rotation on its axis 13, so that the tape is wrapped along the shortest available path on the form until the upper strand of the tape becomes tangent to point Y on the unsupported end 11b. This occurs when the form is in a position in which its unsupported end 11b is pointed axially toward the observer as the apparatus is viewed in FIG. 1.

As soon as the form reaches the latter position, drive mechanism 17 of the spindle is operated to index the form 10 by rotating it slightly on the form axis 13. Thus the point where the tape is tangent to the annular periphery of projection 28b, point Y, is shifted slightly to a closely adjoining new point on the periphery of projection 28b. Following the slight indexing movement of the form, the drive mechanism 17 is stopped so that the form is again held against rotation while it is revolved through an additional 180°, to bring its supported end 11a axially into the view of an observer from the FIG. 1 position. Thus the lowermost strand 34 of the tape F is laid tangentially against the periphery of projection 28a at a new point closely adjacent the previous point X. At this stage, one lengthwise loop has been wrapped completely around the form. To start the second lengthwise loop, the spindle 12 is again indexed slightly to further shift the tangent point of the tape F on projection 28a, and then continued rotation of the table 20 starts another lengthwise loop along a region of the surface of the form slightly offset from the loop.

Figure 6:
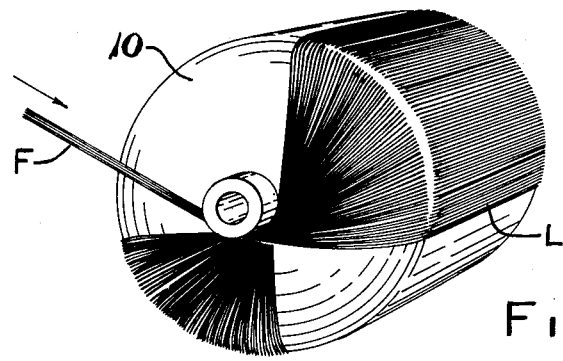
FIG. 6 is a prospective view of the winding form from one end after the form has been partly covered by lengthwise windings.
Figure 9:
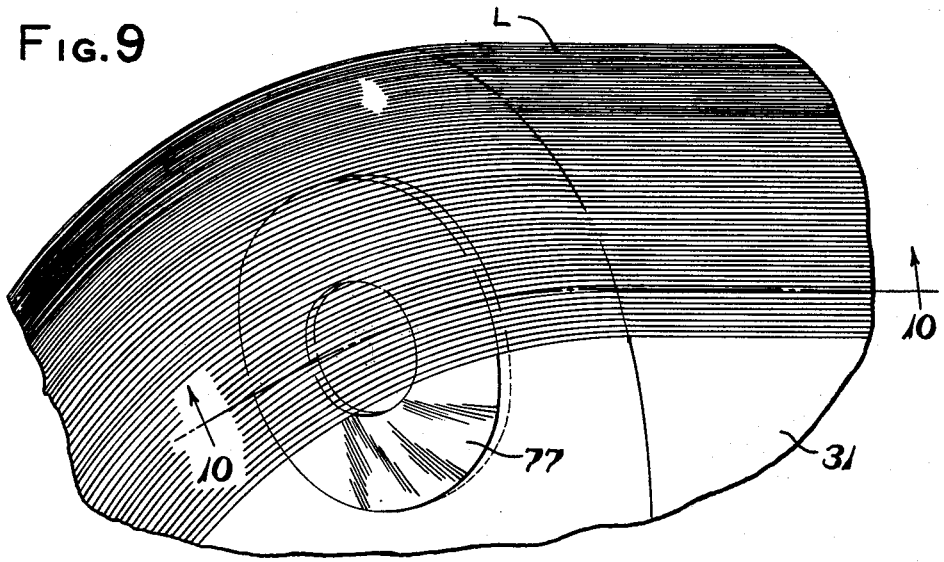
FIG. 9 shows a portion of one end of the building form with a patch as in FIG. 8 incorporated into the longitudinal winding.

The winding proceeds in this manner until the entire surface of form 10 is covered with lengthwise windings L. FIG. 6 illustrates the nature of the winding generated on the form 10 using narrow tapes, by the time the form has been indexed a total of 90° from the position it occupied when the first loop was laid.

The rotary motion of the table 20 about axis 24 may be relatively slow as the lengthwise windings are applied but is smooth and continuous throughout the winding operation. On the other hand, the rotary motion of the form 10 about axis 13 is intermittent and is sufficient to provide only very slight indexing movement. Drive mechanism 17 may be operated intermittently by means of limit switches 53 (FIG. 1) appropriately located under tabe 20 and tripped periodically by lugs 54 on the table as the table is rotated past the switches. Any appropriate motor unit 17a may be used in the drive mechanism 17. For accurate control of the indexing, hydraulic or air operated drives are useful for this purpose.

The proper angle for the axis 13 of form 10 is easily determined in practice by training the tape F to the supported end 11a of the building form and adjusting the position of the form about pivot 14 until the bottom strand of the tape F is tangent to the initially selected point X on the supported end 11a of the form, and the upper strand of tape F is tangent to the corresponding opposite initial point Y on the unsupported end 11b. The term "winding plane" means a plane equal in thickness to the width of the tape in which the tape lies and which is perpendicular to the axis 24 of the table.

Regardless of the shape of the form or its end pieces, it is advantageous to adjust the location of support 15 on table 20 so that axis 24 intersects the longitudinal axis 13 of the form midway between its ends of the form since this arrangement minimizes tension fluctuations in the tape F as the form is revolved. The winding can be accomplished, however, with the rotational axis 24 of the table offset laterally from the form axis 13, or intersecting the form axis 13 anywhere between the ends of this axis on the form. Moreover, it is not essential in practising this mode of winding to have a projection or fitting similar to projection 28a or 28b on the form to wind against, although such objects improve accuracy and ordinarily articles made by this method will include end fittings which may be used for this purpose. The windings will remain in place across a curved end of the winding form so long as the tension in the winding tends to urge the winding substantially perpendicular to the curved end surface engaged by the winding. It is feasible to wind the tape from a projection or fitting at one end to a much smaller annular projection or fitting at the other end by the procedure described. It is also possible to wind lengthwise windings from a projection or fitting at the supported end 11a of the form directly to and over the pole or center of the form at the unsupported end 11b, the form merely being adjusted so that the winding plane intersects the projection and passes through the center of the unsupported end.

In designing articles with reinforcements as provided by this invention it is desirable to minimize the angle between the lengthwise windings and the longitudinal axis 13 of the winding form. This angle of the longitudinal windings is ordinarily determined by the size of the end fittings required, and large diameter end fittings necessarily increase this angle of the longitudinal fittings. For making articles with very large end openings (approaching the girth diameter of the form) it is preferable to wind the lengthwise windings over the end fittings defining the large openings at a very small angle to the form axis 13, and subsequently cut away the portions of the windings at the region of such opening.

When using comparatively narrow tapes (for example tapes in the order of ⅛ to ½ inch in width) it is desirable to index the winding form 10 through an angle such that the tapes in each loop are side by side without overlapping. By carefully controlling the indexing, it is possible to lay the tape portions accurately, one beside the other with no appreciable gap between successive loops.

When using wider tapes, it is advantageous to index the winding form a very much smaller amount so that the tapes are in overlapping relation from one loop to another. For example, by indexing the form at each 180° location such that the tapes are laterally shifted only one half the diameter of one of their strands (as indicated by dimension D in FIG. 7), or an integral multiple of this dimension, the strands may be laid in a tight pack throughout substantially the entire body of the article as illustrated in FIG. 7, thereby minimizing regions of excess resin. The tapes may be wound with the strands stacked as shown in FIG. 7 so that there is practically no change in the wall thickness of the article when the resin matrix of the article is ultimately cured.

By the time the total indexing of the winding form 10 has amounted to 180°, the entire surface of the form is enclosed by at least one layer of the lengthwise windings depending on the amount of index used. For a total indexing amounting to one complete rotation of the winding form, the form will be covered with at least two layers of lengthwise windings, one layer lying at an angle to the longitudinal axis of the form which is equal to but opposite the angle of the strands in the other layer.

Figure 5:
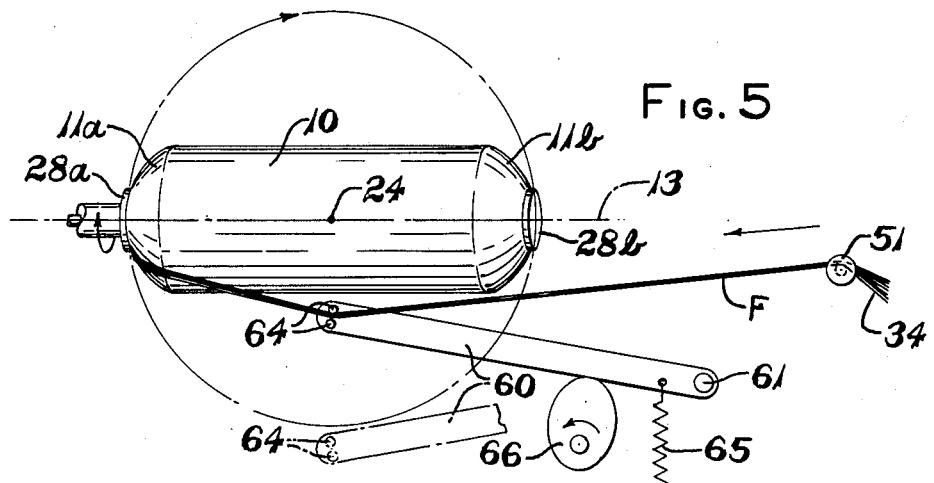
FIG. 5 is a top view of the winding form in a position such as it occupies in FIG. 1 but which is additionally equipped with a guide mechanism for maintaining the filamentary material more closely adjacent the surface of the winding form during winding.

For making articles having a diameter or circumference relatively large with respect to length (such as article shaped like form 10 or with barrel-like proportions), the tape F may be trained directly from the fixed gathering roller 51 to the winding form in the manner illustrated in FIG. 1. However, for articles proportioned so that they are relatively narrower as compared with their length (for example cigar proportions), it is advantageous to train the tape through a guiding arm 60 adjoining the form as shown schematically in FIG. 5. Referring to FIG. 5, guide arm 60 has a fixed vertical pivot 61 and extends to a location adjacent the surface of the winding form 10. The arm 60 lies immediately below the winding plane and is parallel to it. The outer end of arm 60 adjacent the form includes a pair of rollers 64 between which the tape passes as it progresses to the winding form. Arm 60 is biased by spring 65 against the surface of a cam 66 so that when the cam is rotated, the arm 60 is swung toward and away from the winding form about its pivot 61 to maintain the tape at all times in the winding plane. FIG. 5 shows a plan view of arm 60 as it appears when viewing the apparatus of FIG. 1 from above. As indicated in FIG. 5, while the form 10 is rotated clockwise to bring the unsupported end 11b from its three o'clock position shown to its six o'clock position, the cam 66 is rotated so that arm 60 swings counterclockwise in synchronism with the rotation of the form toward its dotted line position in this view. The outer end of arm 60 therefore remains substantially equidistant from the surface of the form. The exact shape of the cam 66 required will, of course, depend on the location of the arm relative to the form and the specific shape of the form. The rotation of the cam is easily synchronized with the rotation of the table 20. In the arrangement of FIG. 5, the desired oscillation of arm 60 is obtained by an appropriate cam rotating at a speed which is about twice the speed of the table rotation so that the arm 60 undergoes two complete cycles of oscillation from the full line position to the dotted position for each revolution of the form about axis 24.

At the conclusion of the longitudinal winding, the rotation of table 20 is stopped and the position of the winding form 10 is changed by adjusting spindle mechanism 12 about pivot 14 to the position shown in FIG. 5 in which the longitudinal axis 13 of the winding form is in a horizontal position to receive the circumferential winding. Normally the table 20 is stopped in a position such that the longitudinal axis of the form is approximately perpendicular to the direction to which the tape approaches the form.

For applying the circumferential windings, the table 20 includes a rotary screw 70 which is mounted in pillow blocks 71 on table 20 in a position parallel to the form axis. The screw 70 is rotated through gearing 72 by an appropriate motor 73 mounted on the table. (This screw has been omitted from FIGS. 1 and 2 for clarity.) The tape is threaded through a traversing head 75 mounted on screw 70 and then onto the winding form.

The circumferential windings C are applied by rotating the form 10 continuously on its longitudinal axis by means of drive mechanism 17 and simultaneously rotating the screw 70 to move the head 75 back and forth lengthwise of the form so that the tape is wound in a close spiral around the form on top of the lengthwise windings. The traverse speed of the head 75 may be set to cause successive convolutions of the girth windings to overlap the tape as shown in FIG. 7 and thus pack the filaments of the tape more densely together. Windings C are built up by traversing the head 75 back and forth until the windings of desired strength are completed.

Figure 8:
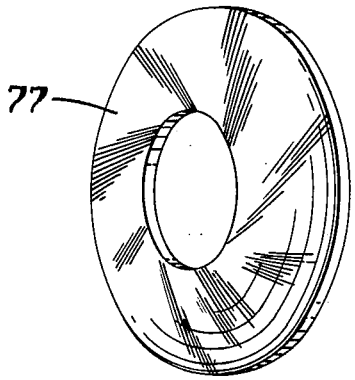
FIG. 8 shows a reinforcing patch which may be incorporated into the windings to permit attachment of fittings to the article.

Many articles of the type suitable for manufacture, according to this invention, include ports or fittings enabling access into the interior of the article. Such fittings may be of plastic or metal, and, as noted in the foregoing, they may be attached to the ends of the winding form and the windings formed integrally about them as the reinforcement is wound. To provide openings at locations other than at the pole portions of the article, thin annular reinforcing patches 77, as shown in FIG. 8, may be wound between the layers of windings. These patches may themselves be, and preferably are, segments of a filament wound article in which the filaments are wound according to the lengthwise winding technique described in the foregoing. Alternatively, such patches 77 can be made up of tapes or filaments laid one upon the other in progressively tangential engagement with the central opening in the patch. The patches may also be molded plastic, rubber or metal rings. Of whatever material, they are initially shaped to conform to the contour of the winding form against which they are positioned.

The reinforcing patch 77 shown in FIG. 8 is a filament wound segment of an article made according to the lengthwise winding operation described in the foregoing. A portion of the rubber layer 31 on the form may be cut away and a patch 77 inset in the rubber layer in the manner shown in FIG. 10. The patch 77 is then coated with a suitable adhesive or resin. Thereafter, one or more layers of the lengthwise winding may be wound on the winding form directly across this patch. Additional similar patches may be applied to the windings concentrically with the first patch between successive layers of the windings, and an outermost patch (not shown) is applied after the winding is complete. Then, after the article is treated to harden the resin, the portions of the winding traversing the central opening of the patches may be cut away and the resulting opening is substantially as strong as if the original windings had remained in this region. Each patch applied in this manner conforms closely to the contour of the article in the region in which the patch is located. After cutting away the windings from the center openings of these patches, fittings or other hardware may be fastened to the article at these reinforcing patches, including various types of metal rings, nozzles, etc. The reinforcing patches may be used in this manner also to provide openings through the circumferential windings.

I claim:
1. The method of making filament-wound pressure vessels comprising:
   (1) supporting a winding form
      (a) for rotation on a first axis through the form between two opposite end portions of the form, and
      (b) for revolution on a second axis transverse to said first axis, and
      (c) so that the angle between said axes is adjustably variable;
   (2) maintaining a continuous length of filamentary material trained to the form for feeding toward the form,
      (a) that portion of the filamentary material adjoining the form being maintained in a fixed winding plane which is normal to said second axis;
   (3) orienting said form relative to said winding plane so that said winding plane intersects preselected regions of said end portions of the form and also intersects said first axis between said end portions;
   (4) continuously revolving said winding form on said second axis so that the filamentary material in said winding plane is wrapped progressively in loops lengthwise of the winding form and which loops extend across said preselected regions of said end portions and along the shortest path between said end portions;
   (5) intermittently rotating the form on said first axis through a small angle during said revolution, said intermittent rotation occurring during only that portion of a revolution on said second axis when each end portion of the form is presented to the filamentary material in said winding plane,
      (a) said angle being of such size as to index the surface of the form relative to said winding plane a distance not exceeding the lateral width of the filamentary material,
   (6) encapsulating said filamentary material in a molding resin as said material feeds toward the winding form as a result of said revolution and rotation of the form;
   (7) stopping said revolution and intermittent rotation of the form after the winding form is enclosed by a series of said lengthwise loops of said filamentary material;
   (8) training a continuous length of resin-covered filamentary material for feeding toward the form in a direction substantially perpendicular to said first axis,
   (9) then rotating said form continuously on said first axis while holding said form stationary on said secondary axis to wrap said filamentary material in a series of loops encircling said form substantially perpendicular to said first axis and overlying said lengthwise loops from one end portion of the form to the other end portion, and
   (10) then treating the resulting composite windings to set said resin into a hard matrix containing said filamentary material.

2. The method of claim 1 characterized by supplying said filamentary material to said winding form in the form of a flat tape of parallel weftless strands of filamentary material, positioning said tape so that it is transverse to the winding plane at the point of contact with the form, and individually regulating tension in each strand of said tape as the same is wound onto the winding form.

3. The method of claim 1 characterized by varying the position in the winding plane from which the filamentary material is trained directly to the form during the revolution of said form on said secondary axis so that said position remains a substantially uniform distance from the surface of the form throughout each said revolution.

(References on following page)

References Cited in the file of this patent

UNITED STATES PATENTS

| | | |
|---|---|---|
| 2,539,404 | Crutchfield et al. | Jan. 30, 1951 |
| 2,566,299 | Abbott | Sept. 4, 1951 |
| 2,788,836 | Trevaskis et al. | Apr. 16, 1957 |
| 2,791,241 | Reed | May 7, 1957 |
| 2,791,324 | Daley et al. | May 14, 1957 |
| 2,966,935 | Wiltshire | Jan. 3, 1961 |

FOREIGN PATENTS

| | | |
|---|---|---|
| 119,588 | Australia | Mar. 1, 1945 |